United States Patent
Hosford et al.

(10) Patent No.: US 11,526,375 B2
(45) Date of Patent: Dec. 13, 2022

(54) SYSTEMS AND METHODS FOR PRE-EXECUTING IDIOSYNCRATIC COMPUTATION THROUGH THE APPLICATION OF ALGORITHMIC PREDICTION OF USER BEHAVIOR PATTERNS

(71) Applicant: Bank of America Corporation, Charlotte, NC (US)

(72) Inventors: Andrew Hosford, Cicero, IL (US); Bricklin Welch, Chicago, IL (US); Mohammad Athar, Carol Stream, IL (US)

(73) Assignee: Bank of America Corporation, Charlotte, NC (US)

( * ) Notice: Subject to any disclaimer, the term of this patent is extended or adjusted under 35 U.S.C. 154(b) by 811 days.

(21) Appl. No.: 16/442,796

(22) Filed: Jun. 17, 2019

(65) Prior Publication Data
US 2020/0394067 A1    Dec. 17, 2020

(51) Int. Cl.
*G06F 9/46* (2006.01)
*G06F 9/38* (2018.01)
(Continued)

(52) U.S. Cl.
CPC ............ *G06F 9/466* (2013.01); *G06F 9/3802* (2013.01); *G06F 16/219* (2019.01); *G06N 3/08* (2013.01);
(Continued)

(58) Field of Classification Search
CPC .. G06Q 20/40145; G06Q 20/10; G06Q 20/40; G06F 16/219; G06F 9/3802;
(Continued)

(56) References Cited

U.S. PATENT DOCUMENTS 7,350,027 B2    3/2008 Gara et al.
7,849,293 B2    12/2010 Blaner et al.
(Continued)

OTHER PUBLICATIONS

Stuart Schechter et al. "Using Path Profiles to Predict HTTP Requests," Google Cache, Apr. 1998.

*Primary Examiner* — Andrew Joseph Rudy
(74) *Attorney, Agent, or Firm* — Weiss & Arons LLP

(57) ABSTRACT

Aspects of the disclosure relate to a machine-learning transaction-prediction engine for seasoning an anticipated manual transaction. The transaction may occur in a transaction session. The seasoning may occur prior to execution of the anticipated manual transaction. The transaction-prediction engine may include a receiving/storage module configured to receive and store identification information of the transactor. The engine may also include a step-retrieval module configured to retrieve a set of in-session transaction steps associated with the transactor. In addition, the engine may include a history-retrieval module configured to retrieve, based on the stored identification information, historical transactional information associated with the transactor. The historical transaction information comprising a plurality of historical transaction patterns associated with the transactor. The engine may also include a processor module configured to initiate the anticipated manual transaction by predicting and provisionally completing the in-session transaction steps. The predicting may be based on the set of in-session transaction associated with the transactor and on the plurality of historical patterns.

18 Claims, 7 Drawing Sheets

(51) Int. Cl.
*G06Q 20/40* (2012.01)
*G06N 3/08* (2006.01)
*G06F 16/21* (2019.01)
*G06N 20/00* (2019.01)

(52) U.S. Cl.
CPC ....... *G06N 20/00* (2019.01); *G06Q 20/40145* (2013.01)

(58) Field of Classification Search
CPC ........ G06F 9/466; G06F 16/9024; G06F 9/46; G06F 9/38; G06F 16/21; G06F 19/206; G07F 19/206; G06N 20/00; G06N 3/0445; G06N 3/08; G06N 3/0454; G06N 3/0472
See application file for complete search history.

(56) References Cited

U.S. PATENT DOCUMENTS

| | | |
|---|---|---|
| 7,953,750 B1 | 5/2011 | Gupta |
| 8,078,853 B1 | 12/2011 | Anvin et al. |
| 8,140,646 B2 | 3/2012 | Mickens et al. |
| 8,522,220 B2 | 8/2013 | Shih-wei Liao et al. |
| 8,566,696 B1 | 10/2013 | Hamon et al. |
| 9,019,643 B2 | 4/2015 | Medard et al. |
| 9,443,197 B1 | 9/2016 | Burkard et al. |
| 10,062,078 B1* | 8/2018 | Boates ............... G06Q 20/4016 |
| 10,068,235 B1* | 9/2018 | Boates ............... G06Q 20/4016 |
| 10,089,579 B1 | 10/2018 | Hamon |
| 10,191,976 B2 | 1/2019 | Raichelgauz et al. |
| 10,332,031 B2* | 6/2019 | Khatravath ........... G06F 16/285 |
| 10,628,829 B1* | 4/2020 | Benkreira ............. G07F 19/207 |
| 10,841,236 B1* | 11/2020 | Jin ........................ H04L 41/12 |
| 11,120,353 B2* | 9/2021 | Olabiyi ............. B60W 50/0097 |
| 11,196,551 B2* | 12/2021 | Weldemariam ....... H04L 9/3247 |
| 2016/0314528 A1* | 10/2016 | Abbott ............... G06Q 30/0269 |
| 2018/0337871 A1 | 11/2018 | Matta et al. |
| 2019/0259033 A1* | 8/2019 | Reddy ...................... G06N 5/02 |
| 2020/0206631 A1* | 7/2020 | Sumant .................. G06V 40/20 |

\* cited by examiner

| 3 | Sentence length |
| 0 | Remove close calls closer than this (ms) |
| | Run model for NBK(s) |
| click | Filter - must include (list will use AND) |
| null | Filter - out (list will use OR) |

Choose File | Combine.txt

Filter by key

Stats:
Number of events: 15136
Number of close calls removed: 0
Number of unique visits: 1237
Number of sentences: 12820
Number of unique event (words): 226

Number of training sentences: 10256
Number of testing sentences: 2564

Train Model

| 256 | Number of lstm layers |

| 500 | Number of epocs |
| 64 | Batch Size |
| 0.1 | Cross validation size (%) |
| 0.2 | Test size after training (%) |

Save Model to file

Load Model

| 0.50 | Prediction Certainty Lower Bound — 310 |

Run Validation

FIG. 3

| Flower Color ▽ | | | | |
|---|---|---|---|---|
| Red | | | | |
| Blue | | | | |
| Green | | | | |

Petal Length ▽   Number of Petals ▽   Get Data ○

| Group | Type | Total Flowers | Average Life | Water Needed |
|---|---|---|---|---|
| Red | Red Roses | 5 | 20 Days | 1 Liter |
| | Red Poppy | 20 | 15 Days | 3 Liter |
| | Red Anemone | 10 | 25 Days | 2 Liter |
| Blue | | | | |
| Green | | | | |

FIG. 4

SYSTEMS AND METHODS FOR PRE-EXECUTING IDIOSYNCRATIC COMPUTATION THROUGH THE APPLICATION OF ALGORITHMIC PREDICTION OF USER BEHAVIOR PATTERNS

FIELD OF TECHNOLOGY

Aspects of the disclosure relate to efficiently processing data transaction requests from a user. Specifically, aspects of the disclosure relate to predicting, and when predicted, pre-executing, possible data calls to a server in order to reduce system latency.

BACKGROUND OF THC DISCLOSURE

Data transaction request processing loads many a server. This loading typically is in the form of the time required to access and process stored information.

The time required to access and process stored information may manifest itself to a user in the formed of increased latency with respect to user requests. Such latency frustrates users and can significantly negatively influence the user experience with the system.

It would be desirable to reduce latency associated with responses to user requests.

It would be even more desirable to reduce latency associated with responses to user requests in a way that is tailored to the individual user.

SUMMARY OF THE DISCLOSURE

Computational logic for seasoning—e.g., pre-fetching of related information—a response to an anticipated manual transaction is provided. The transaction may occur in a transaction session. The seasoning may occur prior to execution of the anticipated manual transaction.

The logic may include instructions for receiving and storing identification information of the transactor. The logic may also include retrieving a set of in-session transaction steps associated with the transactor.

Based on the stored identification information, the logic may further include retrieving and storing historical transaction information associated with the transactor. The historical transaction information may include a plurality of historical transaction patterns associated with the transactor.

Based on the set of in-session transaction steps associated with the transactor and on the plurality of historical patterns, the logic may initiate the anticipated manual transaction by predicting and provisionally completing the in-session transaction steps.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3 shows an user interface (UI) for leveraging historical data according to certain embodiments.

FIG. 4 shows an UI for use with data collection methodology according to certain embodiments.

DETAILED DESCRIPTION OF THE DISCLOSURE

Figure 1:
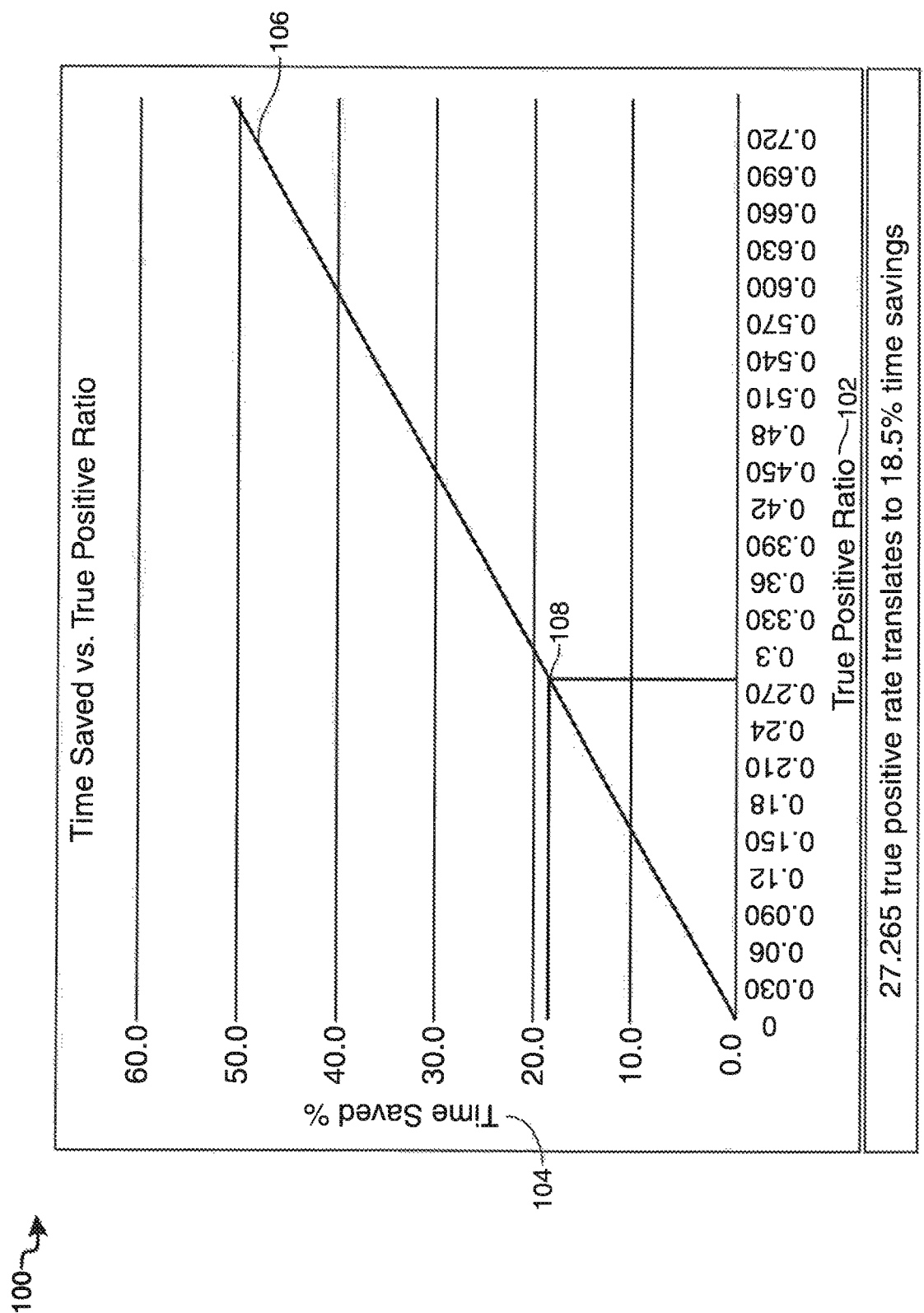
FIG. 1 shows time saved vs. true positive results using algorithms that are back-tested according to certain embodiments.

A computational logic for seasoning an anticipated manual transaction of a transactor occurring in a transaction session is a provided. The seasoning occurs prior to execution of the anticipated manual transaction. The seasoning may include pre-fetching information related to predicting a response to a manual transaction data request.

The computational logic preferably includes receiving and storing identification information of the transactor. The logic also includes retrieving a set of in-session transaction steps associated with the transactor. Based on the stored identification information, the logic may retrieve historical transaction information associated with the transactor. The historical transaction information includes a plurality of historical transaction patterns associated with the transactor.

Based on the set of in-session transaction steps associated with the transactor and on the plurality of historical patterns, the logic may initiate the anticipated manual transaction by predicting and provisionally completing the in-session transaction steps. Such provisional completion may include retrieving information that is anticipated to be requested by the transactor.

In certain embodiments, the receiving and storing may be triggered by the transactor commencing the manual transaction. Commencing the manual transaction may include entering a code into a transaction system. The code may identify the transactor.

In some embodiments, the receiving and storing may be triggered by matching, with a pre-determined confidence level, received identifying information of the transactor with a saved identification profile associated with the transactor.

The level of confidence associated with the received identifying information of the transactor may, in certain embodiments, be augmented by biometric information provided via one or more than one biometric device.

The historical transaction patterns associated with the transactor, in conjunction with a time stamp of the transactor commencing the manual transaction, may be leveraged and/or processed by the computational logic to predict the transaction type associated with the transaction.

The set of in-session transaction steps may include selection by the transactor of a transaction type associated with the manual transaction, prior to the transactor specifying a parameter associated with the manual transaction. The historical transaction patterns associated with the transactor, in conjunction with the transaction type selected by the transactor, may also be leveraged and/or processed by the computational logic to predict the parameter associated with the transaction.

The set of in-session transaction steps preferably includes a selection by the transactor of a not yet completed sequence of numerically input digits. The full sequence of numerically input digits, once received, may specify an amount associated with the transaction. Furthermore, the historical transaction patterns associated with the transactor, in conjunction with the not yet completed selection of the sequence of numerically input digits may be leveraged and/or processed by the computational logic to predict the full sequence of digits specifying the amount associated with the transaction.

Embodiments may also include presenting the transactor with an output of the provisionally completed in-session transaction. In response to confirmation by the transactor of correctness of the output provisionally completed in-session transaction as accurately predicting the anticipated manual transaction, the logic may execute the transaction as provisionally completed. Otherwise, the logic may cancel the transaction as provisionally completed, and await transactor input of further manual input of in-session transaction steps. Then the logic may execute the transaction as manually input by the transactor.

Thereafter, the logic may augment the historical transactional information associated with the transactor with data of the executed transaction. The logic may also store a confirmation input or a cancellation input received from the transactor regarding the correctness of the provisionally-completed transaction request. The logic may store the inputs as a measure of correctness of the prediction. Thereafter, the logic may utilize a neural network to use the stored measure to further train the computational logic toward improving the predictive power of the computational logic.

The measure of the confirmation or otherwise of the correctness of the provisionally completed transaction, preferably reflects at least one of, 1) a point along the transaction at which the computational logic processed the confirmed prediction and 2) a degree of mismatch between the prediction and the transaction as manually input by the transactor.

In certain embodiments, nodes of the neural network may be embedded in one or more than one processor of an Automatic Teller Machine ("ATM"). Input of in-session transaction steps may be delivered via ATM-user input/output interface, and output of the provisionally completed in-session transaction may be delivered via the ATM-user input/output interface.

Some embodiments of the invention may include a machine-learning transaction-prediction engine for seasoning an anticipated manual transaction of a transactor in a transaction session. The seasoning occurs prior to execution of the anticipated manual transaction. The seasoning may include pre-fetching information related to predicting a response to a manual transaction data request.

The transaction-prediction engine may include a receiving/storage module configured to receive and store identification information of the transactor; a step-retrieval module configured to retrieve a set of in-session transaction steps associated with the transactor; a history-retrieval module configured to retrieve, based on the stored identification information, historical transactional information associated with the transactor, the historical transaction information comprising a plurality of historical transaction patterns associated with the transactor; and a processor module configured to initiate the anticipated manual transaction by predicting and provisionally completing the in-session transaction steps. The predicting may be based on the set of in-session transaction steps associated with the transactor and on the plurality of historical patterns.

The receiving/storage module may be triggered to receive and store the identification information by matching, with a pre-determined confidence level, received identifying information of the transactor with a saved identification profile associated with the transactor. The processor module may be configured to predict the transaction type associated with the transaction based on the historical transaction patterns associated with the transactor in conjunction with a time stamp of the transactor commencing the manual transaction.

The input/output module that may be configured to present the transactor with an output of the provisionally completed in-session transaction and may be further configured to receive confirmation or otherwise from the transactor of correctness of the output provisionally completed in-session transaction as accurately predicting the anticipated manual transaction.

The engine may further include an execution/cancellation module configured to, in response to confirmation by the transactor of correctness of the output provisionally completed in-session transaction, execute the transaction as provisionally-completed. In the absence of such confirmation, the execution/cancellation module may cancel the transaction as provisionally completed and execute the transaction as manually input by the transactor.

The engine may further include an augmentation module configured to augment the historical transactional information associated with the transactor with data of the executed transaction. The engine may also include a session-assessment module configured to store a confirmation or cancellation by the transactor of the correctness of the provisionally completed in-session transaction, as a measure of the predictive accuracy of the engine. In addition, the engine may include a neural network configured to use the stored measure to train the transaction-prediction engine toward improving the predictive accuracy of the transaction-prediction engine.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

FIG. 1 shows time saved vs. true positive results 100 using algorithms that are back-tested according to certain embodiments. The True Positive and False Positive rates are a function of the certainty level required for an event to be pre-executed. The higher the certainty requirement, the fewer true and false positives will be fired. Our model assumes only one pre-execution can occur per event. There are 3 possibilities, 1) a pre-execution call is triggered and this turns out to be the right call (rue Positive), 2) a pre-execution call is triggered but this turns out to be the wrong call (False Positive), 3) no pre-execution event reaches a high enough probability to clear the confidence hurdle and, therefore, no pre-execution call is submitted before the user manually submits it.

The x-axis 102 is a true positive ratio. The true positive ratio shows a rate of total user inputs that obtained a true positive response using the back-testing algorithms according to the embodiments.

The y-axis 104 shows a time saved percentage that corresponds to the time savings for each true positive response. Intersection 108 indicates a 27.265% true positive ratio—i.e., a total of 27.265 true positive responses for every 100 user transaction requests—produces 18.5% time savings. Slope 106 shows that as the rate of true positive responses increases, so do the time savings. Every true positive call to the server, which pre-requests information from the server prior to the user actually making the call, reduces latency attributed to loading information from the server in response to the user transmitting the transaction request.

The goal through better modeling is to increase the ratio of true positives to false positives at each certainty level. A well trained model will provide a high ratio of true:false positives at any certainty. Then, based on server load, the certainty level can be adjusted to allow more true and false positives to be executed.

Figure 2:
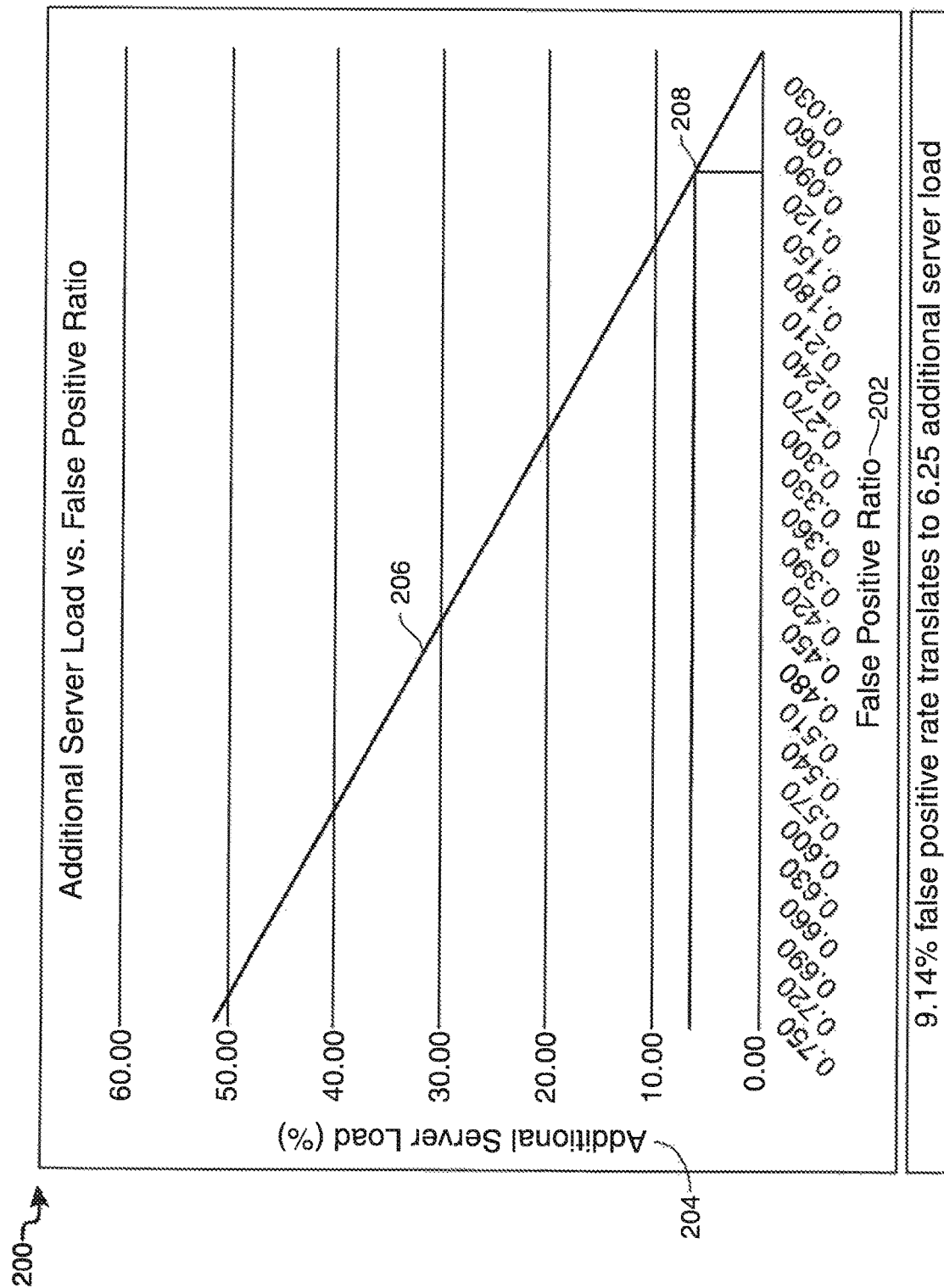
FIG. 2 shows additional results from back-testing algorithms according to certain embodiments.

FIG. 2 shows a graphical rendering 200 of additional results from back-testing algorithms according to certain embodiments. Specifically, FIG. 2 shows additional server load 204 vs. false positive ratio 202. That is to say that FIG. 2 shows that, for the algorithm 206 and conditions of the simulation shown in FIG. 2, a 9.14% false positive ratio 202—i.e., a total of 9.14 false returns for every 100 user transaction requests increases server load by 6.25%.

As the true positive/false positive ratio—i.e., as the rate of true positives vis-à-vis the rate of false positives increases, time savings and resource savings will also increase.

The intersecting lines show the current true and false positive ratios (for a selected one of the rows in Appendix A) as observed in a first predictive model when using a certainty threshold of 70%. As the threshold is increased or decreased, the vertical lines would move horizontally. As threshold decreases, both the True and False Positive ratios will increase (True Positive shown in FIG. 1 slides to the right, False Positive slides to the left). This has the effect of increasing server load due to the increase in false positives, but increases time saved, due to the increase in true positive pre-execution.

Certain embodiments involve a web application. The web application may be used to explore and evaluate training of recurrent neural networks (RNNs) using different hyperparameters.

Appendix A shows hyperparameter grid search results reflecting various testing selections of embodiments according to the disclosure. The definitions below are "hyperparameter" definitions. These define the terms which can be used in a user interface (UI)—such as the UI set forth below in FIG. 3 (and in the portion of the specification corresponding thereto). Such a UI is rudimentary and can be adapted as needed for other suitable applications. It should be noted that this is just an example of a manual grid search tool to set hyperparameters. A more sophisticated deployment may automate the grid search process.

Series Length—Number of events per training sample. A series length of three means two events are used to predict a third event.

Remove close calls closer than a pre-determined number of milliseconds (shown in FIG. 3)—Some events were being captured that were a result of other events. These "automatic" events are not human triggered and should be removed from the events under consideration. "Remove close calls" removes any event that occurred a pre-determined number of milliseconds after the previously-recorded event to attempt to remove events that were automatically triggered by the initial event.

Run model for NBK(s) (nomenclature for unique userID (shown in FIG. 3))—Allows the model to be fine-tuned for a particular user or group of users. Can accept a comma separated list for groups of users.

Filter—includes (list preferably uses AND, but can use any other suitable filter)—Filter will preferably only keep events that include the word or all of the comma separated list of words provided.

Filter—out (list preferably uses OR, but may use any other suitable filter) to filter will exclude any event that includes the word, or any of the comma-separated list of words provided.

Number of LSTM (Long Short Term Memory) layers—The number of input nodes for each internal neural network layer in each LSTM node.

Number of epocs—The number of training cycles to perform.

Batch Size—The number of examples to show before updating weights.

Cross validation size—Percentage of training data to check against model during training.

Test size after training—Percent of total data to set aside for validation

Prediction Certainty Lower Bound—Confidence level required for Softmax (defined below in para. 133) to make an "actionable" prediction. If this confidence level is not met by the event with the highest probability, no event will be pre-executed for the particular test series.

FIG. 3 shows an user interface (UI) 302 for leveraging historical data. This web application may be used to explore and evaluate training of recurrent neural networks using different hyperparameters. The various user inputs allow the user to tune the training information to return desired values, ranges of values and/or observations.

Such user-tuning of training models may include prompting user-inputs 304 of sentence-length, remove close calls closer than this (milliseconds), run model for NBK(s) (user identifier), filter—must include (list will use AND), filter-out (list will use OR), select file (for model), filter by key, dimension reduction load biases, and load weights.

A listing of statistics 306 is shown for the exemplary model used in this particular embodiment. The number of events include 15136, the number of close calls removed is 0, the number of unique visits is 1237 the number of sentences is 12820, the number of unique events (words) is 226, the number of training sentences is 10256 and the number of testing sentences is 2564.

Model training results 308 show a training model with 256 LSTM layers, an epos size of 500, a batch size of 64 a cross validation size of 10% and a test size after training 20%.

The prediction for the certainty lower bound 310 is shown to be 0.50 (a 50% value over which the system will pre-fetch the predicted value).

Models can preferably be saved for further training, or deployment in web applications using a machine learning framework, such as TensorflowJS.

The following are model package files that may be used according to certain embodiments. These model package files are the output of a trained model. They are inputs of the prediction engine.

dictionary.txt—List of key/value pairs: {index: word}, for use in converting a predicted one-hot vector back into an event;

reverseDictionary.txt—List of key/value pairs: (word: index for use in building the one-hot vector from each event "word";

json-model.json—Defines LSTM RNN model;

Json-model.weights.bin—Pre-trained model weights; and listOfHashFieldKeys.txt—Keys used to build word from events; and seriesLength.txt—Number of events needed for prediction.

While the UI 302 shown in FIG. 3 is specific to the model described herein and also specific to selected portions of the data shown in Appendix A, it should be noted that other UIs are contemplated and within the scope of the current invention.

HYPERPARAMETER GRID SEARCH

The following are observations regarding implementation of the hyperparameter grid search shown in Appendix A. This grid search relates to results returned from an exemplary training model defined, at least in part, in FIG. 3.

The following discussion involves and describes the results shown in Appendix A. The following discussion relates primarily to various decision-making taken in the context of the utilizing and further refining a training model for use in certain embodiments.

Series length was adjusted from 3 to 5, but 3 was ultimately chosen as this meant only 2 events were needed to predict a 3rd. Based on the grid search, 3 total events were determined to provide the best true positive to false positive ratio.

The combination of "click" and "null" for the filters was used to isolate the model to non-grid related events only. Grid related events are specific to an Excel TM-like spreadsheet software, used on this particular website. For simplicity, events pertaining to the grid were excluded from the model.

The number of ISM (long-short term memory) layers was held at 256 because this corresponds closely to the number of unique events and is within the memory limits of the hardware on which the model was trained.

Number of epocs was set to 500 as this could be run in a reasonable amount of time and earlier experiments show quickly diminishing returns for longer training periods beyond this point.

RESULTS INTERPRETATION

Earlier experiments showed 10% for training cross validation provided good results. Setting aside 20% of the data is somewhat standard and given the size of the dataset, provides a large enough number of samples for validation.

Event Match (%)—Percent of events that were correctly predicted. This includes non-server call events.

Server Call True Pos (%)—Number of correctly predicted service calls (i.e.,—the user's next action was predicted correctly, and would have resulted in a service call) divided by the total number of actual service calls in the test sample.

Server Call False Pos (%)—Number of incorrectly predicted service calls (i.e., —the prediction met the Prediction Certainty Lower Bound and would have triggered a speculative execution, however the execution would have needed to have been cancelled because the user would not have actually executed it) divided by the total number of actual service calls in the test sample.

True:False Ratio—Number of true positives vs. number of false positives.

2-EVENT SERIES VERSUS 3-EVENT SERIES

A 2-event series LSTM model is essentially mimicking a simple "if this then that" analysis: the event that occurs most often after the first event is the predicted next event.

The following is an investigation as to why is 2-event series (i.e., if this, then that) performed better than 3-event series in this particular embodiment.

Possibility 1: The 2-event series has more training data. More 2-event series can be generated from the same number of visits than 3-event series, thus providing more training data.

Possibility 2: The 2-event series is less stable. Train/test sets are chosen at random from the universe of data. Because more weight is placed on the single interaction between 1st event and predicted event, the validation results (true positives and false positives) may be less stable than models that account for additional event patterns.

This should be further analyzed by running multiple training/validation sets on the 2- vs 3-event series and comparing the validation result distributions.

Possibility 3: The 1st event in the 3-event series is completely uncorrelated with the second and third events, yet the model hasn't been trained long enough to completely ignore the first event by setting zero weight to its hidden and memory states.

It is possible that the 3-event series overtake the 2-event series in accuracy if the first two events are not completely uncorrelated to the third, the third event series should overtake the 2-event series when more, better, and/or cleaner, data becomes available.

The following is the cost/benefit analysis methodology that was used in preparing the simulation of the embodiments on historical data.

Avg Response Time=was taken as 6 s, based on previous user experience.

Avg Time Saved Per True Pos Service Call—Time between predictive event and predicted event was calculated from users data. If this time exceeded 6 seconds (s), it was replaced by 6 s, as this is the maximum benefit from early execution.

Times were averaged over entire data set. Avg Time Saved Per True Pos Service Call=4.12 s Time Saved Through Speculative Execution Per True Positive =Avg Time Saved Per True Pos Service Call*True Pos Rate =4.12 s*0.27 (see FIG. 1)=1.1124 s Avg Time Saved Per Service Call =Time Saved Through Speculative Execution Per True Pos/Avg Response Time =1.1123/6 s=18.5%

Additional Server Load Per False Pos

=AvgTime Saved Per True Pos Service Call*False Pos Rate

=4.12 s*0.091 (see FIG. 2)=0.375 s

Avg Additional Server Load

=Additional Server Load Per False Pos/AvgResponse Time

=0.375 s/6 s=6.25%

The following code is pseudocode, according to some embodiments, for gathering data, shaping data, training algorithm, and applying speculative execution.

The following gather data code preferably records whether, when the user is on a first website, the user interacts with the website without calling a central server, or the user interacts with the website and calls the server. If the user request calls the server, then the word CALL is appended to the file.

```
gather_data( ):
    log = log_file_name
    while user_is_on_website:
        if object_interacted_with:
            log.write(obj_name + timestamp + user_ID)
        if object_calls_server:
            log.write("CALL_" + obj_name + timestamp + user_ID)
```

The following shaping data code preferably records whether, when the user is on a first website, the user interacts with the website without calling a central server, or the user interacts with the website and calls the server. Data X is a series of inputs, and Data Y is a "call server" notation or no "call server" notation. The code also goes through the log file line by line and build up the events. The algorithm is based on the userID because the log files is directed to files that are directed to particular users.

```
shaping_data( ):
    obj_list = [ ]
    user_ID_list =[ ]
    for line in log_file:
        obj_list = obj_list.append(obj_names)
        user_ID_list = unique(user_ID_list.append(user_ID))
    obj_dict = create_one_hot_dictionary(obj_names)
    user_ID_dict = create_one_hot_dictionary(user_ID_list)
    data_X = [ ]
    data_Y = [ ]
    for line in log_file:
        shaped_line_X = [obj_dict[obj_name], user_ID]
        Y = 0 if "CALL_" not in line else 1
        data_X.append(shaped_line_X)
        data_Y.append(Y)
    return data_X, data_Y
```

The next portion of the code, the training_algorithm( ), takes the data_X, data_Y and reshapes it into numeric data at dimensionality_reduction(data_X[obj_name]), data_X[user_ID]. Then the words—i.e., the numeric information, which is translated into words—is then translated into an event.

```
training_algorithm( ):
    data_X, data_Y = shaping_data( )
    data_X = [dimensionality_reduction(data_X[obj_name]), data_X[user_ID]]
    word_list = [ ]
    for UID in user_ID_dict.keys( ):
        word_list = word_list.append(pivot_data_by_user_ID_concatenate_data_X( ))
    my_algo = neural_net(hyperparameters)
    for word, Y in zip(word_list, data_Y):
        my_algo.retrain(word, Y)
```

The following applying spec ex( ) code preferably runs on the client-facing application. More particularly, this code runs on whatever is being executed by the client-facing application. First, the code defines a threshold. The defining of a threshold, in this embodiment, calculates a current server load and max server load (to be set at or close to 100%). Then the code runs a loop that includes—capturing the ongoing event.

If the event is an event that calls the server, then the code shows using the event to retrain the model—at server call_probability=my_algo.apply(obj_name).

If the event is not one that calls the server, then the probability of a server call based on the request is determined—as shown in server_call_probability=my_algo.apply(obj_name). This line of code shows using preferably all (or some selection of) the events prior to the current event and calculating the probability that the next event will be a server call.

If the probability that the next event is sufficiently high, then the code retrains, at my_algo.retrain(dimensionality_reduction(event_list), 0), and executes a speculative call to the server in order to be prepared for a predicted server call—at shown in returned_data=call_server(event_list). In addition, the code shows using the current event to retrain the algorithm in order to keep it as smart as possible vis-à-vis the new results, as shown in the line my_algo.retrain(dimensionality_reduction(event_list), 1). The flag is reset to zero—because when the flag is zero—it shows that the server is not called, and therefore does not have to be reset. In this case, the flag, set at 1, indicates that the server has been called and should preferably be reset to zero in order to prepare for the next request.

It should be noted that the server calls described herein are typically calls for data that the user requests. This server call is typically categorized, for the purposes of this disclosure, as a transaction request. Such a transaction request may include requesting data for a date certain, or a range of dates, that will shape the server call. An example of an event that doesn't call the server is—the user selects the calendar, but does not call the server, then calls a particular region but still does not call the server, then the user selects a particular company and then and only then in this example, calls the server. In this example, the code would not predict a server call until the particular company was selected. It should be noted that the first two selections—i.e., for the date range and region—would not implicate a server call at least because such selections would not predict a server call, but the third selection, where the user selects a business in the selected dates and regions, would rise to the probability of an impending server call.

In the particular example shown in the code, the return data is set to none—because, in this particular example, nothing has been returned yet, as shown at returned_data=None. The matrix is blocked out for storing the event list, as shown at event_list=[ ].

```
applying_spec_ex( ):
    call_threshold = server_load/max_server_load
    while user_on_site( ):
        returned_data = None
        event_list = [ ]
        if object_interacted_with:
            if obj_name == "call_server":
                my_algo.retrain(dimensionality_reduction(event_list), 1)
                return returned_data
            else:
                event_list = event_list.append(obj_dict(obj_name))
                server_call_probability = my_algo.apply(obj_name)
                if server_call_probability > call_threshold:
                    my_algo.retrain(dimensionality_ reduction(event_list), 0)
                    returned_data = call_server(event_list)
                    return returned_data
```

FIG. 4 shows an UI for use with data collection methodology according to certain embodiments. Exemplary user interaction shows a menu that generates a set of parameters defining a data transaction, Events are recorded, each dashed box 402, 404, 406, 408, 410 as well as the group in 412 represents an action that can be, upon user selection, recorded as an event. Columns 414, 416, 418 and 420 show various statistics associated with the exemplary user selection of "red" in column 12.

Figure 5:
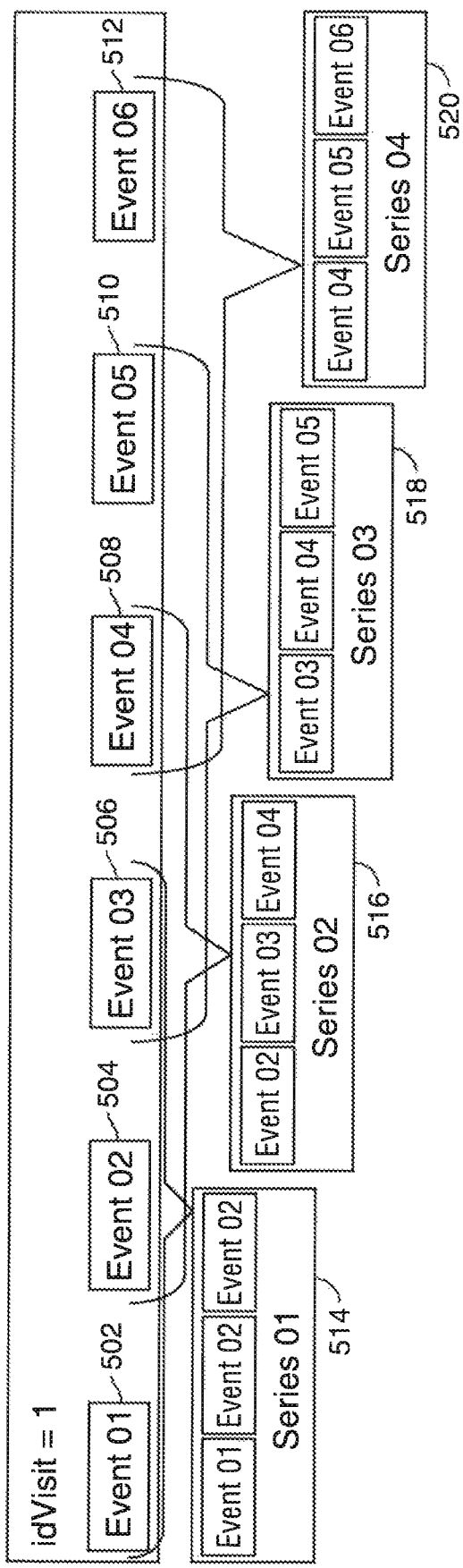
FIG. 5 shows an illustrative flow diagram for raining a Long Short Term Memory (LSTM) RNN according to certain embodiments.

FIG. 5 shows preprocessing event data for Recurrent Neural Network (RNN) training. The example shows a series length of 3.

The idVisit is identified as an exemplary 1. Events 1-6 are shown at 502-512. Series 01-04 are shown at 514-520. Each of series 01-04 is formed from a group of three events.

The workflow in FIG. 5 operates as follows. Data is pulled from a statistical database (shown as events 01-03 at series 516). Data is organized by a unique userId and ID visit and sorted by millisecondTimeStamp (not shown). For each IDVisit, series of events are created as a window of events. This pre-processing is used as a precursor to the operations shown in FIGS. 6 and 7.

The first two events of the series typically make up the x-axis, and the third event was the y-axis determination (not shown). The y-axis determination provides the predicted next event.

Figure 6:
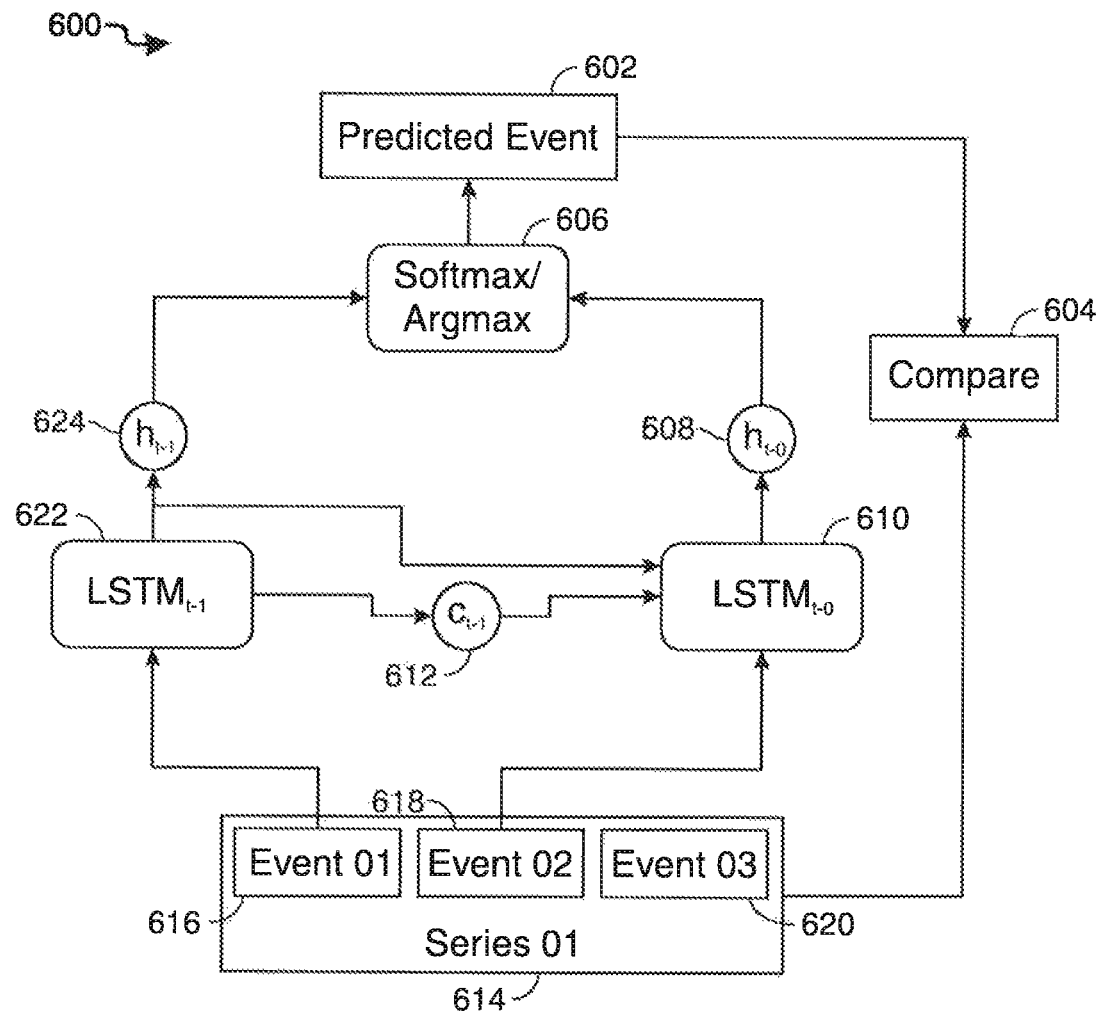
FIG. 6 shows an illustrative flow diagram of deployment of an event prediction service according to certain embodiments.

FIG. 6 shows an illustrative flow diagram 600 for training an LSTM RNN. The objective is to predict the third event based on the previous two (see above, with respect to FIG. 5). More particularly, FIG. 6 shows predicting an event based on a pre-determined number of preceding events. It should be noted that a selection of pre-determined events does not preclude the fact that the weights and biases in the prediction system take into account a much broader range of events which may, in certain embodiments, include all of the relevant historic events.

In this exemplary embodiment, training for each series is done by converting events into "words." More particularly, words are created by concatenating several of the event's attributes as defined by a listofhashfieldkeys variable and using a word2vec algorithm for one-hot encoding.

Initially, all events are vectorized into a one-hot vector. For the purposes of this disclosure, the term "one-hot" should be understood to refer to a 1×N matrix (vector) used to distinguish each word in a vocabulary from every other word in the N-word vocabulary. The vector typically includes 0s in all cells with the exception of a single 1 in a cell used uniquely to identify the word.

This example assumes a series length of three. Series 01, shown at 614, includes events 01-03.

Event 01 616 is fed to $LSTM_{t-1}$ 622.
Event 02 618 is fed to $LSTM_{t-0}$ 610.

Each LSTM 610, 622 typically includes a layered neural network—i.e., a neural network that is capable of learning a certain target function.

Each $LSTM_{t-i}$ where i>0, emits memory state $c_{t-i}$, as shown at 612.

Each $c_{t-i}$ is then fed to $LSTM_{t-i+1}$, as shown at 610.

Each LSTM 610, 622 emits hidden state $h_{t-i}$ as shown at 624, and 608, respectively. The hidden state, commonly referred to as a hidden layer, in an artificial neural network is a layer in between input layers and output layers, where artificial neurons take in a set of weighted inputs and produce an output through an activation function. An activation function typically performs a transformation on the input received. Such a transformation may be implemented, for example, to preferably normalize and preferably maintain values within a manageable range.

Softmax activation (an activation function that receives the outputs and performs a transformation thereon) is used to emit a probability density for each possible next event. Argmax (another activation function that receives the outputs and performs a transformation thereon) is applied to predict the event with highest probability from the Softmax vector. These are shown, schematically, at 606.

At 604, the event predicted at 602 is compared to actual Event 3, set forth at 620.

Based on the comparison, model weights used in the predicting may preferably be adjusted and the process may be repeated for a user-defined, or system set, number of epocs.

Model definition and weights may be saved to individual files. These files are saved as a "model package" and can be accessed at different intervals.

These files may be generated when the model is trained and saved. These files are then ingested into the live website application and prediction may be executed on the client machine. When fully implemented, the client machine can send a pre-execution command to the service if the confidence threshold of the prediction is achieved.

Figure 7:
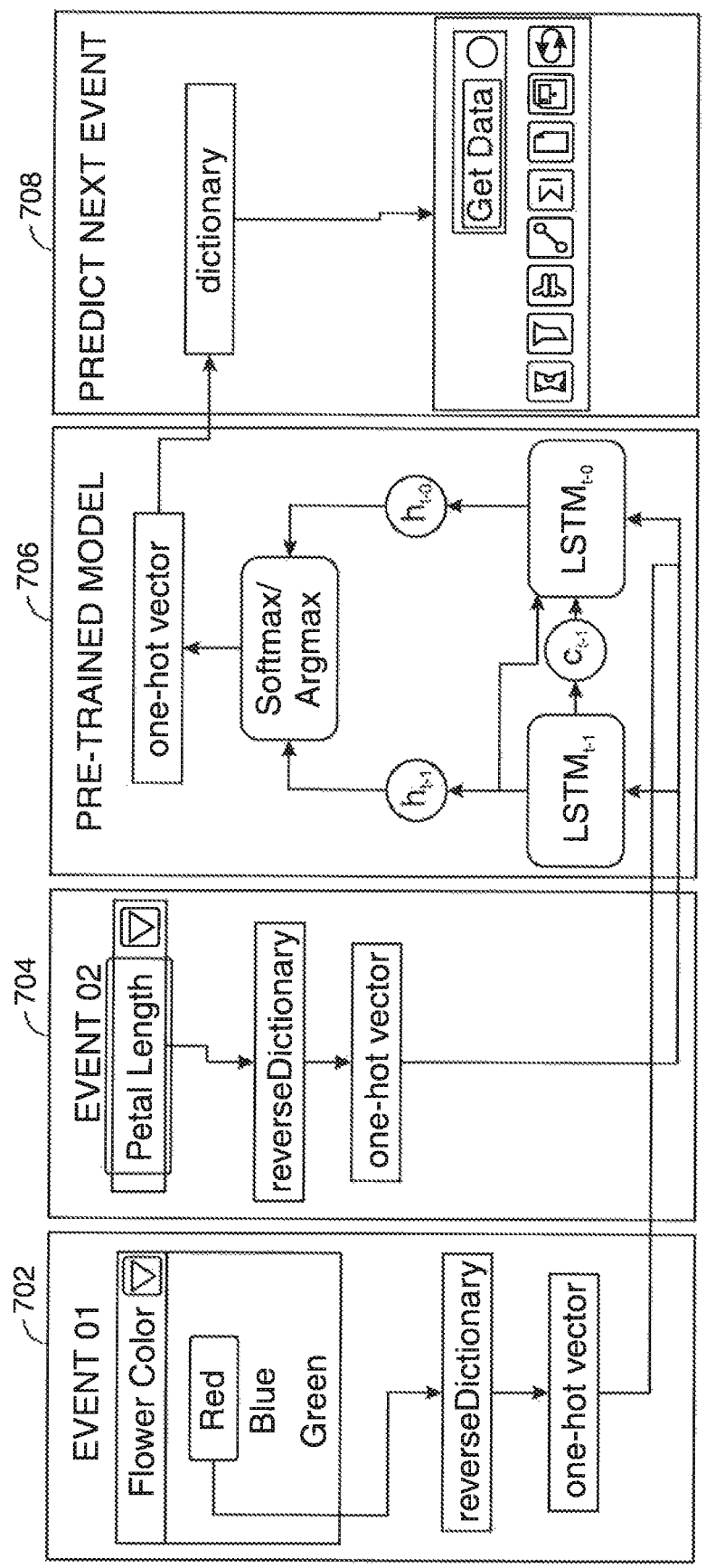
FIG. 7 shows another illustrative flow diagram of deployment of an event prediction service according to certain embodiments.

FIG. 7 shows an illustrative flow diagram of deployment of an event prediction service, which can also be used for testing models and associated weights and biases, according to certain embodiments. Step 702 shows loading event 1 into an LSTM. In this particular case, the selected term red is used to retrieve, from a reverse dictionary, a one-hot vector corresponding to the selected term "red." The one-hot vector represents a matrix that includes a set of follow-up event possibilities.

Step 704 shows loading event 2 into an LSTM. In this particular case, the selected term petal length is used to retrieve, from a reverse dictionary, a one-hot vector corresponding to the selected term "petal length", The one-hot vector represents a matrix that includes a set of follow-up event possibilities.

Step 706 shows using a pre-trained model to leverage pre-determined weights and biases (see $h_{t-1}$, $h_{t-0}$ and $c_{t-1}$) in order to calculate a prediction. The system preferably predicts every possible event that could occur.

Each possible event is assigned a probability. All event possibilities are stored in the dictionary as shown in 708. If one of the events achieves a maximum probability—or a highest probability relative to the other possible outcome events, then the client machine can send a pre-execution command to the service. Thereafter, when the user selects get data, as also shown in 708, and the selection matches the data requested by the prediction-based, pre-executed, command, then the data may be delivered with substantially zero latency.

If the data requested by the prediction-based, pre-executed, command, matches the data requested by the user, then the logic may be maintained or even reinforced. If not, the system should adjust the predictive weights and biases accordingly.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, fir example, by storing computer-executable instructions or modules or by utilizing computer-readable data structures.

Thus, methods and systems for pre-executing idiosyncratic computation through the application of algorithmic prediction of user behavior patterns are provided. Persons skilled in the art will appreciate that the present invention can be practiced by other than the described embodiments, which are presented for purposes of illustration rather than of limitation, and that the present invention is limited only by the claims that follow.

What is claimed is:

1. A computational logic for pre-processing of information related to predicting a response to an anticipated manual transaction of a transactor, the transaction occurring in a transaction session, said pre-processing occurring prior to execution of the anticipated manual transaction, said computational logic comprising:
  receiving and storing identification information of the transactor;
  retrieving a set of in-session transaction steps associated with the transactor;
  based on the stored identification information, retrieving historical transactional information associated with the transactor, said historical transaction information comprising a plurality of historical transaction patterns associated with the transactor; and
  based on the set of in-session transaction steps associated with the transactor and on the plurality of historical patterns, initiating the anticipated manual transaction by predicting and provisionally completing the in-session transaction steps.

2. The computational logic of claim 1, wherein the receiving and storing are triggered by the transactor commencing the manual transaction.

3. The computational logic of claim 2, wherein the commencing the manual transaction includes entering a code into a transaction system, the code identifying the transactor.

4. The computational logic of claim 1, wherein the receiving and storing are triggered by the matching, with a pre-determined confidence level, of received identifying information of the transactor with a saved identification profile associated with the transactor.

5. The computational logic of claim 4, wherein the received identifying information of the transactor is at least augmented by biometric information provided via one or more than one biometric device.

6. The computational logic of claim 4, wherein the historical transaction patterns associated with the transactor, in conjunction with a time stamp of the transactor commencing the manual transaction, are processed by the computational logic to predict the transaction type associated with the transaction.

7. The computational logic of claim 1, wherein the set of in-session transaction steps includes selection by the transactor of a transaction type associated with the manual transaction, prior to the transactor specifying a region associated with the manual transaction.

8. The computational logic of claim 1, wherein the set of in-session transaction steps includes selection by the transactor of a transaction type associated with the manual transaction, prior to the transactor specifying a range of dates associated with the manual transaction.

9. The computational logic of claim 1, wherein the set of in-session transaction steps includes selection by the transactor of a transaction type associated with the manual transaction, prior to the transactor specifying an entity associated with the manual transaction.

10. The computational logic of claim 1, wherein:
  the set of in-session transaction steps includes a selection by the transactor of a not yet completed sequence of information, the full sequence to specify a region and range of dates associated with the transaction; and
  the historical transaction patterns associated with the transactor, in conjunction with the not yet completed selection of the sequence of numerically input digits are processed by the computational logic to predict the full sequence of digits specifying the amount associated with the transaction.

11. The computational logic of claim 1, further comprising:
  presenting the transactor with an output of the provisionally completed in-session transaction steps;
  in response to confirmation by the transactor of correctness of the output provisionally completed in-session transaction steps as accurately predicting the anticipated manual transaction, executing the transaction as provisionally completed; and
  otherwise, cancelling the transaction as provisionally completed, awaiting transactor input of further manual input of in-session transaction steps, and executing the transaction as manually input by the transactor.

12. The computational logic of claim 10, further comprising:
  augmenting the historical transactional information associated with the transactor with data of the executed transaction;

saving a measure of the confirmation or otherwise by the transactor of the correctness of the provisionally completed in-session transaction steps as accurately predicting, via machine learning, the anticipated manual transaction; and utilizing a neural network to use the saved measure to further train the computational logic toward improving the predictive power of the computational logic.

13. The computational logic of claim 12 wherein the measure of the confirmation or otherwise of the correctness of the provisionally completed transaction, reflects at least one of:

a point along the transaction at which the computational logic processed the confirmed prediction; and a degree of mismatch between the prediction and the transaction as manually input by the transactor.

14. A machine-learning transaction-prediction engine for pre-processing of information related to predicting a response to an anticipated manual transaction, the transaction occurring in a transaction session, said pre-processing occurring prior to execution of the anticipated manual transaction, said transaction-prediction engine comprising:

a receiving/storage module configured to receive and store identification information of the transactor;

a step-retrieval module configured to retrieve a set of in-session transaction steps associated with the transactor;

a history-retrieval module configured to retrieve, based on the stored identification information, historical transactional information associated with the transactor, said historical transaction information comprising a plurality of historical transaction patterns associated with the transactor; and a processor module configured to initiate the anticipated manual transaction by predicting and provisionally completing the in-session transaction steps, said predicting based on the set of in-session transaction steps associated with the transactor and on the plurality of historical patterns.

15. The transaction-prediction engine of claim 14, wherein the receiving/storage module is triggered to receive and store the identification information by the matching, with a pre-determined confidence level, of received identifying information of the transactor with a saved identification profile associated with the transactor.

16. The transaction-prediction engine of claim 15, wherein the processor module is configured to predict the transaction type associated with the transaction based on the historical transaction patterns associated with the transactor in conjunction with a time stamp of the transactor commencing the manual transaction.

17. The transaction-prediction engine of claim 14, further comprising:

an input/output module configured to:

present the transactor with an output of the provisionally completed in-session transaction; and receive confirmation or otherwise from the transactor of correctness of the output provisionally completed in-session transaction as accurately predicting the anticipated manual transaction; and an execution/cancellation module configured to:

in response to confirmation by the transactor of correctness of the output provisionally completed in-session transaction, execute the transaction as provisionally completed; and otherwise, cancel the transaction as provisionally completed and execute the transaction as manually input by the transactor.

18. The transaction-prediction engine of claim 17, further comprising:

an augmentation module configured to augment the historical transactional information associated with the transactor with data of the executed transaction;

a session-assessment module configured to store a measure of the confirmation by the transactor of the correctness of the provisionally completed in-session transaction; and a neural network configured to use the stored measure to train the transaction-prediction engine toward improving the predictive accuracy of the transaction-prediction engine.

* * * * *